US012346915B2

(12) United States Patent
Gupta et al.

(10) Patent No.: US 12,346,915 B2
(45) Date of Patent: Jul. 1, 2025

(54) SYSTEM AND METHOD FACILITATING HARMONIZING OF AUTOMOTIVE SIGNALS

(71) Applicant: CEREBRUMX LABS PRIVATE LIMITED, Haryana (IN)

(72) Inventors: Amit Gupta, Haryana (IN); Sandip Ranjhan, Delhi (IN); Sarika Gupta, Haryana (IN)

(73) Assignee: Cerebrumx Labs Private Limited, Haryana (IN)

( * ) Notice: Subject to any disclaimer, the term of this patent is extended or adjusted under 35 U.S.C. 154(b) by 210 days.

(21) Appl. No.: 17/972,362

(22) Filed: Oct. 24, 2022

(65) Prior Publication Data

US 2023/0230104 A1    Jul. 20, 2023

(30) Foreign Application Priority Data

Jan. 19, 2022  (IN) .............................. 202211002971

(51) Int. Cl.
*G06Q 30/0201* (2023.01)
*G07C 5/00* (2006.01)

(52) U.S. Cl.
CPC ......... *G06Q 30/0201* (2013.01); *G07C 5/008* (2013.01)

(58) Field of Classification Search
CPC ........... G06Q 10/00–50/00; G07C 1/00–15/00
USPC ............................................... 705/7.11–7.42
See application file for complete search history.

(56) References Cited

U.S. PATENT DOCUMENTS

| 6,738,697 | B2 * | 5/2004 | Breed | B60C 11/246 |
| | | | | 701/32.4 |
| 8,140,358 | B1 * | 3/2012 | Ling | G07C 5/008 |
| | | | | 340/439 |
| 10,977,601 | B2 * | 4/2021 | Bowne | G06Q 10/0639 |
| 11,532,186 | B1 * | 12/2022 | Wiegman | G07C 5/0808 |
| 11,610,286 | B2 * | 3/2023 | Toshniwal | G06T 5/70 |
| 2003/0009270 | A1 * | 1/2003 | Breed | B60N 2/0276 |
| | | | | 701/32.4 |
| 2004/0130442 | A1 * | 7/2004 | Breed | G06V 20/593 |
| | | | | 340/449 |

(Continued)

OTHER PUBLICATIONS

Elmagarmid, Ahmed K., Panagiotis G. Ipeirotis, and Vassilios S. Verykios. "Duplicate record detection: A survey." IEEE Transactions on knowledge and data engineering 19.1 (2006): 1-16. (Year: 2006).*

*Primary Examiner* — Alan S Miller
(74) *Attorney, Agent, or Firm* — Matthew D. Thayne; Thayne and Davis LLC

(57) ABSTRACT

The present invention provides a robust and effective solution to an entity or an organization by allowing aggregation of a set of automotive data packets pertaining to single trip using one or more common identifiers and one or more timestamps to enable enhanced data analytics and data correlation. The set of automotive data packets may be then segregated based on a plurality of sensor signals and a plurality of calculated signals to obtain a set of derived signals. The set of derived signals can provide an option of moving calculation of derived signals outside of vehicle to reduce computation cost on the vehicle. The size of the data packets may be optimized by sending the plurality of sensor signals outside of minimum signal set, only when one or more values change from the last stored value.

18 Claims, 5 Drawing Sheets

(56) References Cited

U.S. PATENT DOCUMENTS

| | | | |
|---|---|---|---|
| 2006/0212194 A1* | 9/2006 | Breed | G07C 5/008 |
| | | | 701/1 |
| 2014/0136658 A1* | 5/2014 | Wahler | H04W 48/18 |
| | | | 709/218 |
| 2019/0155291 A1* | 5/2019 | Heit | G05D 1/0221 |
| 2019/0265712 A1* | 8/2019 | Satzoda | B60W 40/09 |
| 2021/0133947 A1* | 5/2021 | Li | G01S 17/931 |
| 2021/0319637 A1* | 10/2021 | Tammali | H04W 4/027 |

* cited by examiner

SYSTEM AND METHOD FACILITATING HARMONIZING OF AUTOMOTIVE SIGNALS

FIELD OF INVENTION

The embodiments of the present disclosure generally relate to system and methods that facilitate enhancing big data associated with vehicles. More particularly, the present disclosure relates to a system and method for harmonizing the automotive data received from a plurality of sources before generating business insights or distributing the data.

BACKGROUND OF THE INVENTION

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Today smart vehicles generate large amount of data every second, which gets collected in the vehicle manufacturer's cloud. Vehicle data is collected from a plurality of data sources from original equipment manufacturers (OEM) to aftermarket devices, containing different data signals, formats with different signal terminology, and units of scale. Automotive data signals collected from different OEMs, different TRIM within same OEMs and same make or model in different countries, varies significantly. Every OEM or aftermarket service provider, use their signal definition and range representing the automotive sensor data. Sometimes this signal definition and range vary across vehicles from the same OEM. This data, based on the business needs, is further consumed by the data consumers to derive useful insights pertaining to vehicle health, driver driving patterns, fleet tracking, audience measurement, consumer buying patterns, city planning, etc.

Typically, there can be 500+ data signals that are generated from connected vehicle. Most data consumers such as Insurers, fleet managers need to collect vehicle-specific data but may need data for multiple vehicles manufactured by different OEMs. Additionally, the consumers use the automotive data collected from plurality of sources to generate usable analytical insights and/or used for training complex machine learning automotive algorithms. Based on the source of data in vehicle, the data signals can be broadly categorized as follows Telematics
Body Control
ADAS
Diagnostics
In-Vehicle Infotainment Data consumers such as Insurance, vehicle service contract etc. companies need to process data from vehicles manufacture by different OEMs, using the data distributed by OEM cloud or via 3rd party distributors. Processing heterogeneous data received from plurality of data sources is very challenging as the data may have to be ingested from a large number of sources in different format with different interpretation. For example, an OEM in Europe may report coolant temperature in ° C. and another OEM in North America may be reporting the coolant temperature in ° F. Data for a single vehicle may be received in multiple data streams. To deduce meaningful inferences, these streams need to be correlated and aggregated into a single stream.

There is an inconsistency in the derived data signals shared by OEMs. Derived data signals are the signals that are derived from the vehicle sensor signal data. For example, harsh braking is a derived data signal, that is calculated using the acceleration signals collected in the vehicle. Every OEM has their own list of derived signals, which they can provide or distribute. However, for the data consumer, it is very challenging to change their data processing and analytics engine on addition of a new OEM or new vehicle type. Additionally, some of these derived signals may actually be important for deriving business insights. Hence, the consumer shall have the additional burden of extracting derived signals from the vehicle sensor signals. Data received from OEMs is not clean and is prone to contain invalid, duplicate data entries, which do not add any value for the data consumer but add to processing overhead. For example, seat belt status is of significance only when the vehicle is running and it is not buckled. Hence, this data point should be shared with the data consumer only once when the seat belt in unbuckled and when it has been buckled not with every second of data.

There is therefore, a need in the art to provide a system and a method that can overcome the shortcomings of the existing prior art and harmonize the incoming data streams in order to generate a uniform data stream for the easy ingestion and analysis.

OBJECTS OF THE PRESENT DISCLOSURE

Some of the objects of the present disclosure, which at least one embodiment herein satisfies are as listed herein below.

It is an object of the present disclosure to provide for a system that aggregates a set of data packets received from a plurality of sources such as OEM, After market dongle and the like for a single vehicle trip in one format, using common identifiers.

It is an object of the present disclosure to provide for a system that enables trip level insights along with vehicle level insights, with data correlation matrix.

It is an object of the present disclosure to provide for a system for segregating derived signals from sensor signals to derive the cost price of the signals from the data providers.

It is an object of the present disclosure to provide for a system that reduces the cost of data received from a provider.

It is an object of the present disclosure to provide for a system Data processing and storage optimization by efficient filtering of signals, based on data consumer needs.

It is an object of the present disclosure to provide for a system for distributing a data signals from multiple providers with the same taxonomy is extremely useful for the data consumers that need data from multiple providers. It helps optimize the data ingestion and processing and reduces processing and integration overhead.

SUMMARY

In an aspect, present disclosure provides for a system facilitating harmonizing of automotive data of a vehicle. The proposed system may include a plurality of sensors associated with the automotive vehicle, a processor and a harmonizing module coupled to the processor. The harmonizing module may receive a first set of signals from a first sensor of the plurality of sensors during a trip of the automotive vehicle. The trip indicates a time during which ignition of the automotive vehicle is continuously ON. A second set of signals may be received by the harmonizing module from the distributed storage system associated with the automotive vehicle, the second set of signals pertaining to a set of signals derived from the set of sensor signals and stored in the distributed storage system. The harmonizing module may generate a third set of signals by aggregating the first and the second set of signals with a predefined identifier associated with the first sensor. The harmonizing module may then organise, the third set of signals generated in a predefined format based on a predetermined set of parameters comprising a signal name, signal type, signal range, description and timeline associated with the first and the second set of signals received. In an exemplary embodiment, the third set of signals may be sent as a trip message to a user computing device.

In an aspect, present disclosure provides for a system facilitating harmonizing of automotive data of a vehicle. The method may include the steps of receiving, by a harmonizing module, a first set of signals from a first sensor of a plurality of sensors captured during a trip of the automotive vehicle, wherein the trip indicates time during which ignition of the automotive vehicle is continuously ON. The method may include the step of receiving, by the harmonizing module, a second set of signals from a distributed storage system associated with the automotive vehicle, the second set of signals pertaining to a set of signals derived from the set of sensor signals and stored in the distributed storage system. The method may further include the step of generating, by the harmonizing module, a third set of signals generated by aggregating the first and the second set of signals with a predefined identifier associated with the first sensor; and then the step of organising, by the harmonizing module, the third set of signals generated in a predefined format based on a predetermined set of parameters comprising a signal name, signal type, signal range, description and timeline associated with the first and the second set of signals received and the third set of signals may be then sent as a trip message to a user computing device.

The present disclosure further pertains to a non-transitory computer readable medium comprising machine executable instructions that are executable by a processor. Upon such execution of the machine executable instructions, the processor may cause the non-transitory computer readable medium to: receive, by a first set of signals from a first sensor of the plurality of sensors during a trip of the automotive vehicle. The trip indicates a time during which ignition of the automotive vehicle is continuously ON. A second set of signals may be received by the processor from the distributed storage system associated with the automotive vehicle, said second set of signals pertaining to a set of signals derived from the set of sensor signals and stored in the distributed storage system. The processor may generate a third set of signals by aggregating the first and the second set of signals with a predefined identifier associated with the first sensor. The processor may then organise, the third set of signals generated in a predefined format based on a predetermined set of parameters comprising a signal name, signal type, signal range, description and timeline associated with the first and the second set of signals received. In an exemplary embodiment, the third set of signals may be sent as a trip message to a user computing device.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It will be appreciated by those skilled in the art that invention of such drawings includes the invention of electrical components, electronic components or circuitry commonly used to implement such components.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

The present invention provides a robust and effective solution to an entity or an organization by allowing aggregation of a set of automotive data packets pertaining to single trip using one or more common identifiers and one or more timestamps to enable enhanced data analytics and data correlation. The set of automotive data packets may be then segregated based on a plurality of sensor signals and a plurality of calculated signals to obtain a set of derived signals. The set of derived signals can provide an option of moving calculation of derived signals outside of vehicle to reduce computation cost on the vehicle. The size of the data packets may be optimized by sending the plurality of sensor signals outside of minimum signal set, only when one or more values change from the last stored value.

Figure 1:
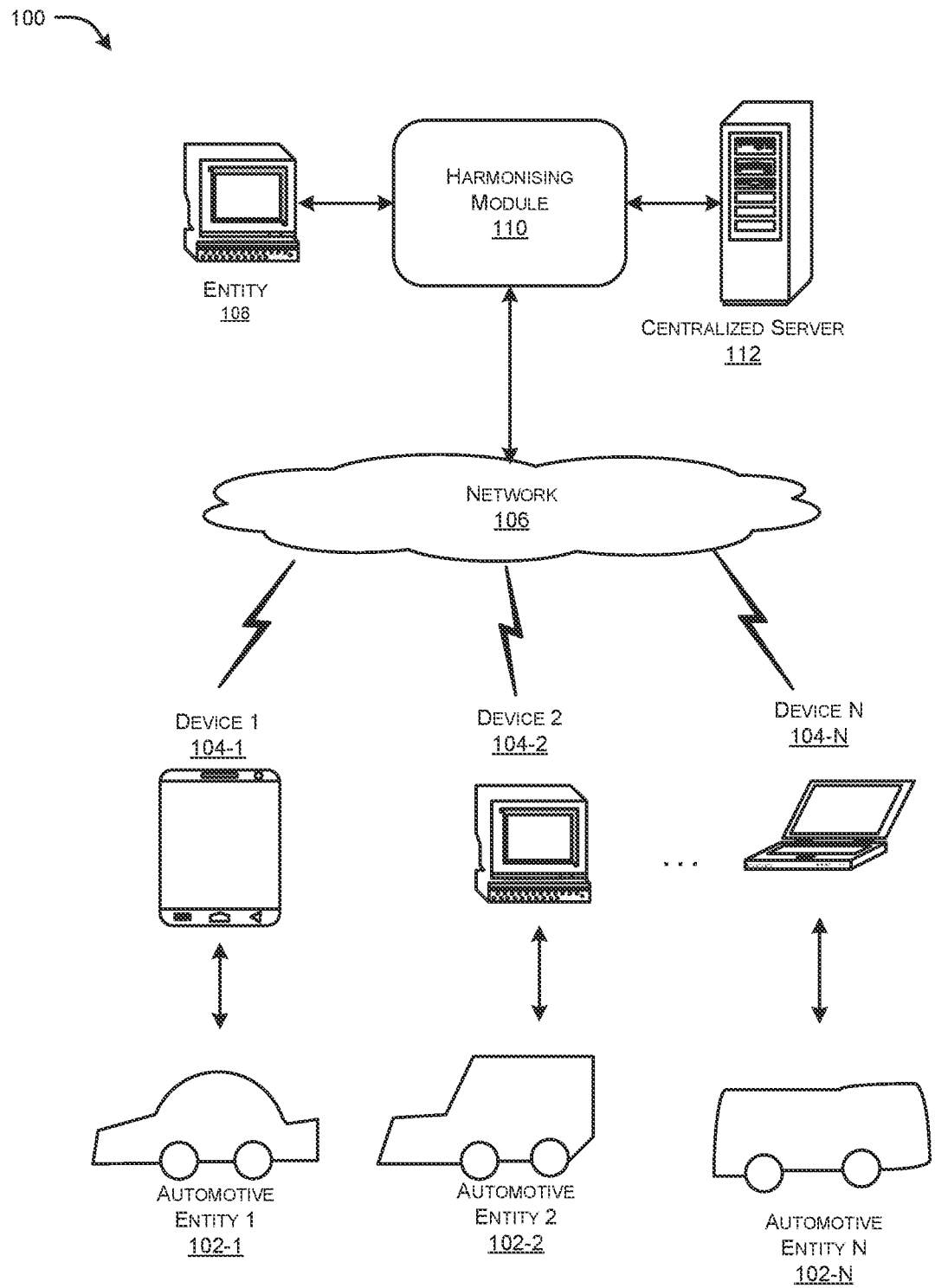
FIG. 1 that illustrates an exemplary network architecture in which or with which a proposed harmonizing module of the present disclosure can be implemented, in accordance with an embodiment of the present disclosure.

Referring to FIG. 1 that illustrates an exemplary network architecture (100) in which or with which a harmonizing module (110) of the present disclosure can be implemented, in accordance with an embodiment of the present disclosure. As illustrated, the exemplary architecture (100) includes a harmonizing module (110) for harmonizing a set of automotive data packets received from one or more first computing devices (104) associated with a plurality of automotive vehicles (102-1, 102, . . . 102-N) (collectively referred to as automotives (102) and individually referred to as automotive (102) to be stored in one or more second computing devices (108) associated with an entity. In an embodiment, the set of data packets may correspond to automotive data signals from a plurality of sensors associated with the plurality of automotive (102) but not limited to it and may include automotive data signals corresponding to telematics, Body Control, ADAS, Diagnostics, in-Vehicle infotainment and the like.

In an exemplary embodiment, the one or more first computing devices (104) may include a plurality of distributed source systems. The distributed source systems may include a plurality pf sensors, data providers, OEM and the like. And the one or more second computing devices (108) may include a plurality of distributed Storage Systems.

The harmonizing module (110) may be coupled to a centralized server (112). The harmonizing module (110) may also be operatively coupled to one or more first computing devices (104) and one or more second computing devices (108) through a network (106).

In an embodiment, the harmonizing module (110) may receive the set of automotive data packets from the first computing devices (104) associated with the plurality of automotives (102). The set of data packets may be received at a specific frequency and in specific quantity/numbers. In an embodiment, the first set of data packets may include a first set of signals and a second set of signals. The first set of signals may be received by the harmonizing module from a first sensor of the plurality of sensors during a trip of the automotive vehicle. The trip indicates a time during which ignition of the automotive vehicle is continuously ON. The second set of signals may be received by the harmonizing module from the distributed storage system (108) associated with the automotive vehicle, said second set of signals pertaining to a set of signals derived from the set of sensor signals and stored in the distributed storage system. The harmonizing module may generate a third set of signals by aggregating the first and the second set of signals with a predefined identifier associated with the first sensor. The harmonizing module (110) may then organise, the third set of signals generated in a predefined format based on a predetermined set of parameters comprising a signal name, signal type, signal range, description and timeline associated with the first and the second set of signals received. In an exemplary embodiment, the third set of signals may be sent as a trip message to a user computing device.

The harmonizing module (110) may further be configured to process the automotive set of data packets received through a plurality of processing logic modules to obtain a derived set of signals.

In an embodiment, the harmonizing module (110) may be configured to update the database every time and an end-to-end data completeness check for each of the data pipeline can be enabled and visualized by the harmonizing module (110) that may send the processed set of data packets to the second computing device (108).

In an embodiment, the harmonizing module (110) may define collection of the first set of signals such as the set of sensor signals collected directly from a plurality of vehicle sensors and most of the set of sensor signals can be useful in their original form. The set of sensor signals may include odometer, acceleration, speed, ignition on/off and the like. However, as the analytics capabilities of the systems have improved, the capability to generate derived signals using the set of sensor signals has improved. The second set of signals (also referred to as the derived signals hereinafter) may be derived by the harmonizing module. Some of the derived signals are related to vehicle health such as distance/days to service, Oil life, Tire life, Engine load and the like and driver behavior such as harsh braking, rapid acceleration, sharp cornering and the like.

In an exemplary embodiment, each set of derived signals can be represented by:
  signal_name: common name of the signal used to represent automotive signals.
  type: data type required to store the signal value
  signal_range: range of the signal to ensure invalid values are discarded
  description, which describes the representation of each integer value for enumeration signals as well as units for non-enumeration signals. The enumeration signal may be defined as a signal of any numeric type, provided that the underlying integers of all enumerated values input to the system are within the range of the numeric type.

In an exemplary embodiment, the harmonizing module (110) may be configured to add one or more predefined identifiers to interlink a plurality of third set of signals (also referred to as data streams here) received from the automotive vehicle (or simply referred to as vehicle hereinafter). In a way of example and not as a limitation, the vehicle can start sending a data stream, when the vehicle ignition is turned ON and can stop sending the data stream when the vehicle ignition is switched OFF. The set of sensor signals can be collected while the trip is in progress. The set of derived signals can either be collected while the trip is ongoing or calculated after the trip has been completed.

In an exemplary embodiment, a third set of attributes may be added with the third set of signals to enable meaningful analysis of the set of sensor signals collected during the trip. The third set of attributes may include:
  Vehicle Identification Number (VIN): VIN is unique Vehicle identifier that defines a vehicle. It can be vehicle registration number or a generated vehicle identifier that uniquely identifies a vehicle.
  Trip Identifier (TripId): TripID is a unique identifier that uniquely identifies a vehicle trip for a vehicle
  Signal Generation Timestamp (SGT): SGT is the timestamp, when the signal is generated in the vehicle or is derived.
  Signal collection Timestamp (SCT): This is the timestamp, when the signal is collected for distribution. There can be multiple SCT signals for a given trip data based on the collection and distribution hops involved.

In an exemplary embodiment, each trip message sent to a user computing device may contain
  VIN
  TripId
  List of SCT, SCT1 . . . SCTN, where SCT1 is the timestamp on first hop, to which data is sent from the vehicle or where the derived signal is calculated and SCTN is the timestamp on final hop, where data is distributed to the consumer.

List of VSI [VS1 . . . VSn] where each entry contains Vehicle Signal Name, Signal Value and SGT for that signal. n is the total number of sensor signals in the message, where n>=1

List of DSI [DS1 . . . DSm], where each entry contains Derived Signal Name, Signal Value and SGT for that signal. m is the total number of derived signals in the message, where n>=1

SCT and SGT timestamp is converted to EPOCH UTC time for common time reference

In an embodiment, the harmonizing module (110) may be configured to define a minimum signal set. While a list of sensor signals and derived signals may be received from the OEM, every signal may not be significant for the user, if its value does not change. In a way of example and not as a limitation, a user may want to receive location parameters with every data message but may not need seat belt status unless its value changes from the last known value. Hence, a minimum signal set may include all signals that need to be sent with each message or be present with each trip data entry in a batch data file. This set contains the signals, where recording of these signals need to be shared with the consumer irrespective of the change. Below are some of the examples of signals, which can be added in Minimum Signal Set. However, the list can be extended as per data consumer requirement such as but not limited to Location
Ignition
Speed
Overspeeding In an embodiment, the harmonizing module (110) may be configured to harmonizing the set of sensor signals including but not limited to Data across OEMs/data providers
Data received from plurality of sources, for a single vehicle In an embodiment, the one or more first computing devices (104), the one or more second computing devices (108) may communicate with the harmonizing module (110) via set of executable instructions residing on any operating system, including but not limited to, Android™, iOS™, Kai OS™ and the like. In an embodiment, to one or more first computing devices (104), and the one or more second computing devices (108) may include, but not limited to, any electrical, electronic, electro-mechanical or an equipment or a combination of one or more of the above devices such as mobile phone, smartphone, virtual reality (VR) devices, augmented reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen, receiving devices for receiving any audio or visual signal in any range of frequencies and transmitting devices that can transmit any audio or visual signal in any range of frequencies. It may be appreciated that the to one or more first computing devices (104), and the one or more second computing devices (108) may not be restricted to the mentioned devices and various other devices may be used. A smart computing device may be one of the appropriate systems for storing data and other private/sensitive information.

In an embodiment, the harmonizing module (110) or the centralized server (112) may include one or more processors coupled with a memory, wherein the memory may store instructions which when executed by the one or more processors may cause the system to access content stored in a network.

Figure 2:
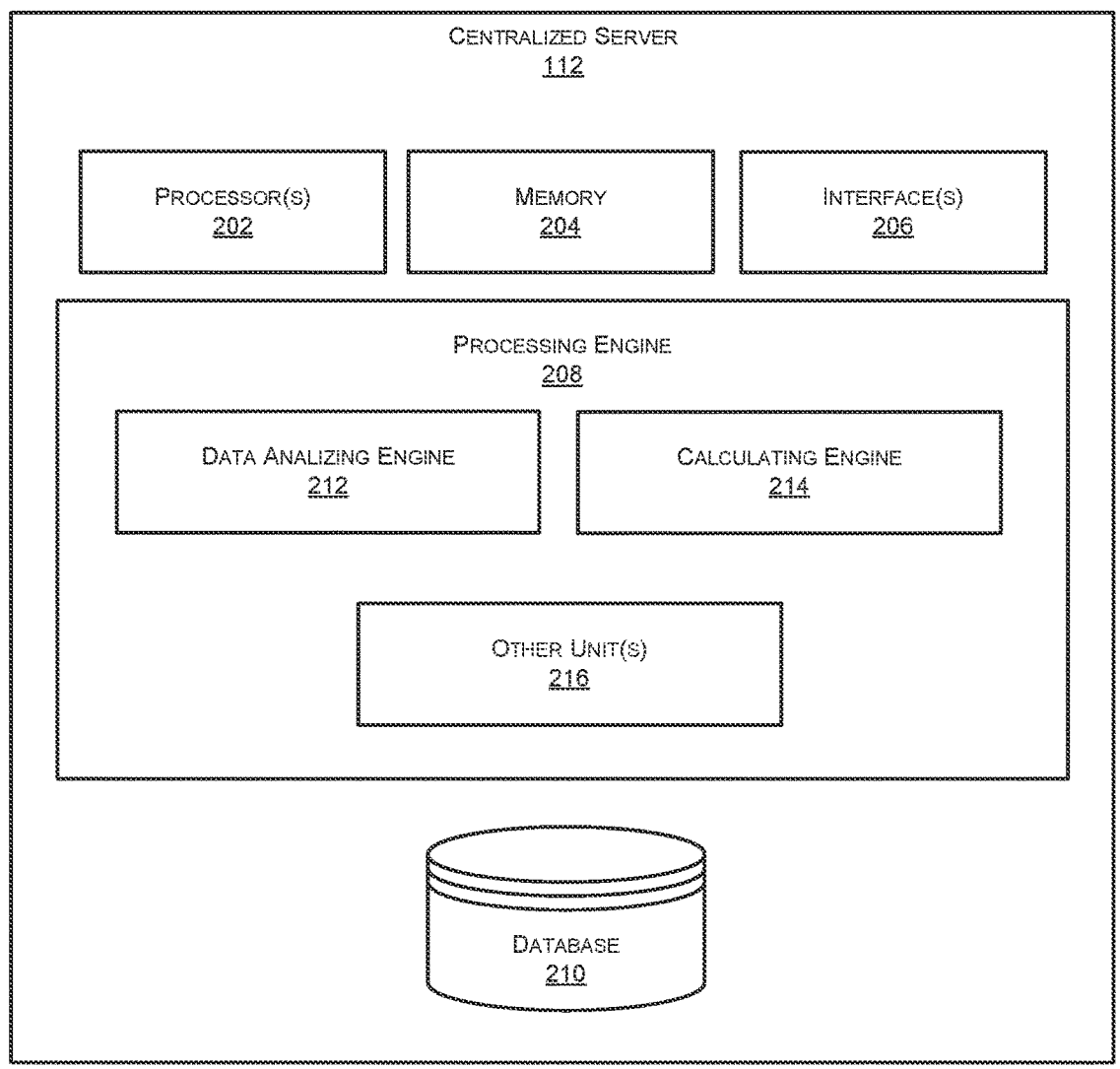
FIG. 2 illustrates an exemplary representation of harmonizing module/centralized server for accessing content stored in a network, in accordance with an embodiment of the present disclosure.

FIG. 2 with reference to FIG. 1, illustrates an exemplary representation of harmonizing module (110)/centralized server (112) for facilitating real time automotive data feeds, in accordance with an embodiment of the present disclosure. In an aspect, the harmonizing module (110)/centralized server (112) may comprise one or more processor(s) (202). The one or more processor(s) (202) may be implemented as one or more microprocessors, microcomputers, microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the harmonizing module (110). The memory (204) may be configured to store one or more computer-readable instructions or routines in a non-transitory computer readable storage medium, which may be fetched and executed to create or share data packets over a network service. The memory (204) may comprise any non-transitory storage device including, for example, volatile memory such as RAM, or non-volatile memory such as EPROM, flash memory, and the like.

In an embodiment, the harmonizing module (110)/centralized server (112) may include an interface(s) 206. The interface(s) 206 may comprise a variety of interfaces, for example, interfaces for data input and output devices, referred to as I/O devices, storage devices, and the like. The interface(s) 206 may facilitate communication of the harmonizing module (110). The interface(s) 206 may also provide a communication pathway for one or more components of the harmonizing module (110) or the centralized server (112). Examples of such components include, but are not limited to, processing engine(s) 208 and a database 210.

The processing engine(s) (208) may be implemented as a combination of hardware and programming (for example, programmable instructions) to implement one or more functionalities of the processing engine(s) (208). In examples described herein, such combinations of hardware and programming may be implemented in several different ways. For example, the programming for the processing engine(s) (208) may be processor executable instructions stored on a non-transitory machine-readable storage medium and the hardware for the processing engine(s) (208) may comprise a processing resource (for example, one or more processors), to execute such instructions. In the present examples, the machine-readable storage medium may store instructions that, when executed by the processing resource, implement the processing engine(s) (208). In such examples, the harmonizing module (110)/centralized server (112) may comprise the machine-readable storage medium storing the instructions and the processing resource to execute the instructions, or the machine-readable storage medium may be separate but accessible to the harmonizing module (110)/centralized server (112) and the processing resource. In other examples, the processing engine(s) (208) may be implemented by electronic circuitry. The processing engine (208) may include one or more engines selected from any of a data acquisition engine (212), a calculating engine (214), and other engines (216).

Figure 3:
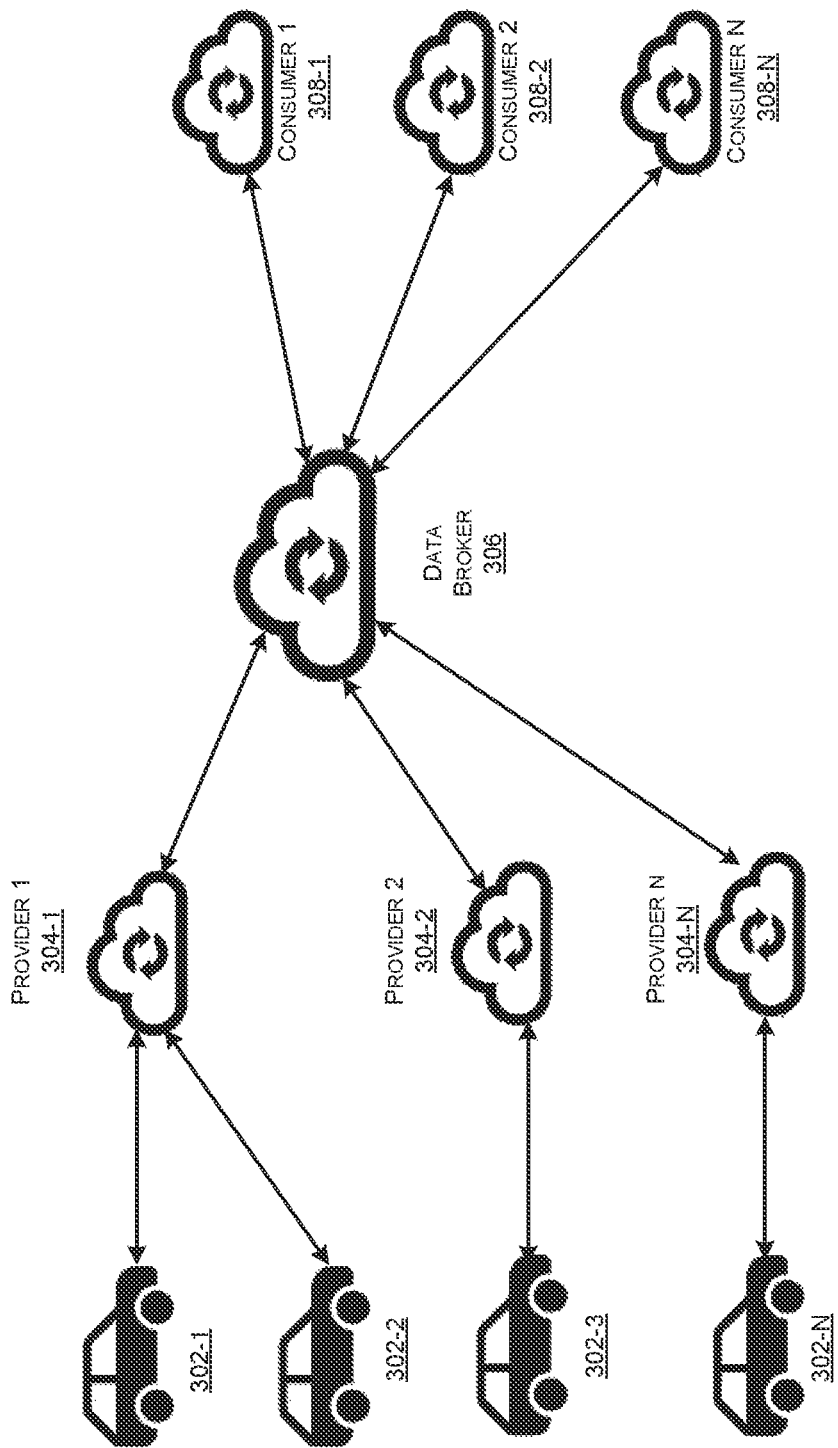
FIG. 3 illustrates an exemplary representation of an overall system configuration, in accordance with an embodiment of the present disclosure.

FIG. 3 illustrates an exemplary representation of an overall system configuration, in accordance with an embodiment of the present disclosure.

As illustrated, the overall system may include the set of data packets (also referred to as automotive signals hereinafter) being collected to and from a plurality of vehicles (302-1, 302-2, . . . 302-N or 102-1, 102-2 . . . 102-N in FIG. 1) from a plurality of second computing devices (108) associated with an entity or entities (also referred to as providers (303-1, 303-2, . . . 303-N) herein) communicatively coupled to a harmonizing module (110) (also referred to as the data broker (306) herein) and a plurality of users (102) (also referred to as consumers (308-1, 308-2 . . . 308-N herein).

Figure 4:
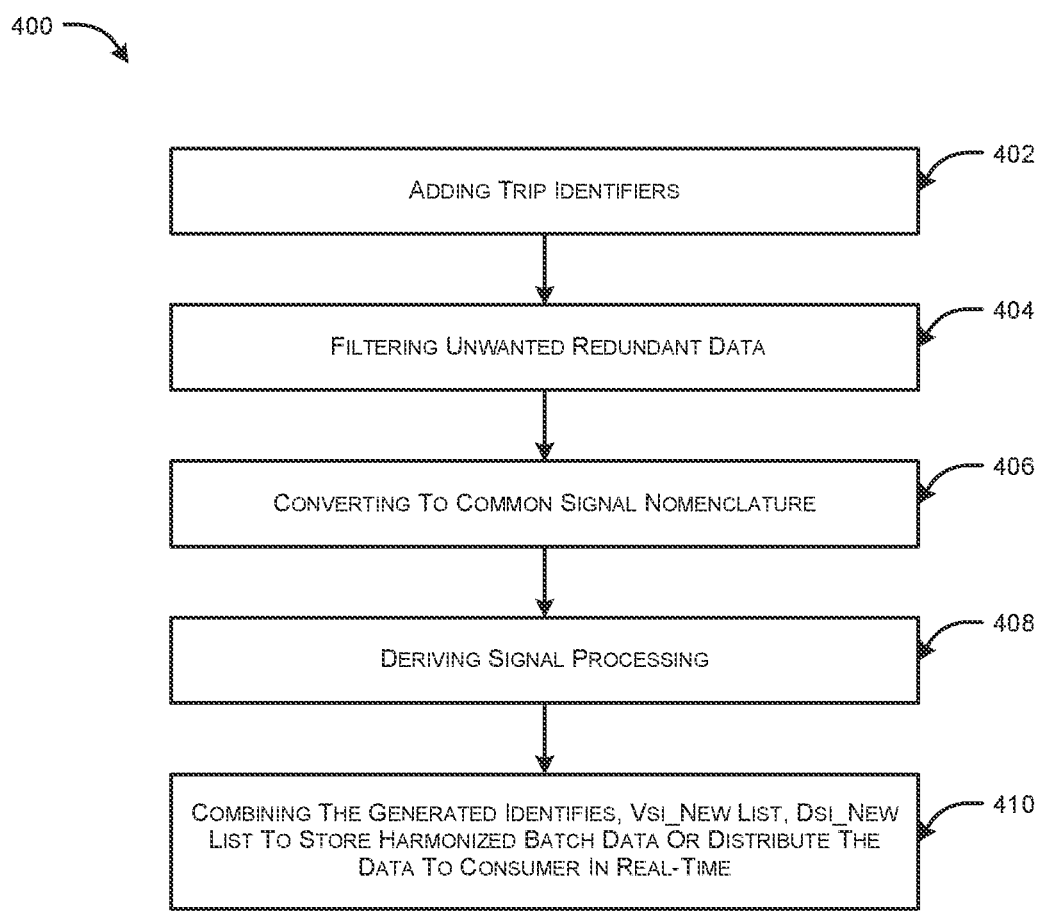
FIG. 4 illustrates an exemplary representation of a proposed method associated with the harmonizing module, in accordance with an embodiment of the present disclosure.

FIG. 4 illustrates an exemplary representation of the proposed method, in accordance with an embodiment of the present disclosure.

In an embodiment, the proposed method may include the at 402, the step of adding trip identifiers. The data for a single vehicle may be received in real-time, batch or both modes. The method may further include at 404 the step of filtering unwanted redundant data and at 406, the step of converting to a predefined signal nomenclature. Further the method may include at 408, the step of deriving signal processing and at 410, the step of combining the generated identifies, VSI_new list, DSI_new list to store harmonized batch data or distribute the data to consumer in real-time.

In an exemplary embodiment, the set of automotive data packets may be received in at least three modes such as a real time mode, a batch mode and mixed mode but not limited to the like.

In an exemplary embodiment, the step of adding identifiers at 402 may include receiving automotive data in real-time as the vehicle is moving, checking the message data received. If the message data doesn't contain VIN, reject the message else go to 406. If message contains SCT or a List of SCT, store the same in SCT1 to SCTN-1, set current EPOCH time in SCTN, else set SCT1 to current EPOCH time

```
    If message contains unique trip identifier, store it in TripId field,
else set TripId as follows
    If active_TripId for VIN is NULL, generate new
    TripId= <VIN><Timestamp received in SCT1>
    active_tripId=TripId
        else
        TripId=active_tripId
```

In an exemplary embodiment, the set of automotive data packets may be received in a predetermined data file that may be at least two modes such as batch mode and real time mode but not limited to the like.

In the batch mode, the set of automotive data packets may be received once the trip has been completed. The data received may contain trip data for multiple trips simultaneously. Hence, the data needs to be segregated into trips as follows

```
If the doesn't contain VIN, reject the message else go to step 2
If message contains SCT or a List of SCT,
// convert SCT to EPOCH UTC time
// store the same in SCT1 to SCTN-1, set current EPOCH time in SCTN,
else set SCT1 to current EPOCH UTC time.
If data contains unique trip identifier, combine all data entries with the
same trip id for the VIN and store in a trip file else
//use combination of ignition start/stop, timestamp to create the trip file as
follows
//check the entry for ignition start and check the list of ignition stop
signals with SGT higher than ignition start
//use the ignition stop signal, whose SGT timestamp has minimum distance
from the ignition start SGT timestamp.
//Generate TripId=<VIN> < SCT1 Timestamp received with ignition start
signal entry>
//Combine all data signals between the ignition start SGT time and
ignition stop
SGT time and create trip file before further processing
```

In an exemplary embodiment, in the mixed mode, automotive data may be received for a single vehicle in both batch and real-time mode. Data is combined using timestamp, VIN and ignition state as it is received in real-time and batch. TripId is generated during real-time data processing and later batch data is combined with real-time data using the batch mode processing.

In an exemplary embodiment, at 404, filtering unwanted redundant data may further include checking for signals with invalid, out of range and NULL values, removing the signals from the list, getting the list of signals that are not in the Minimum Signal Set and compare the signal values with the last stored data. Remove the signals, where the data has not changed since last stored data, as that is redundant data. This shall optimize the size of data to be shared with data consumer.

In an exemplary embodiment, at 406, converting to the predefined signal nomenclature may further include creating a new list of VSI signals, VSI_new of size n, where n is the number of VSI signals received. For each VSI signal

```
\ VSI_newi .signal_name=convert VSi.signal_name to standard signal
name
    convert VSi.value as follows and store in VSI_newi .value
    //convert value as per the common units defined for the signal. For
    e.g. speed received may be in KM/H,
    but if the configured distance_unit is set to Miles,
    speed value is converted from KM/H to Miles/H
    // convert value as per the common range and enumeration for the sig-
nal
    if VSi.SGT !=NULL
        convert SGT to EPOCH UTC time
        set VSI_newi.SGT= VSi.SGT
    else
        //drop the signal
```

In an exemplary embodiment, at 408, deriving signal processing may further include creating a new list of DSI signals, DSI_new of size k, where k is the number of VSI signals received and k>=m. For each DSI received

```
DSI_newi .signal_name=convert DSi.signal_name to standard signal name
convert DSi.value as follows and store in DSI_newi .value
//convert value as per the common units defined for the signal.
// convert value as per the common range and enumeration for the signal
if DSi.SGT !=NULL
    convert SGT to EPOCH UTC time
set DSI_newi.SGT= DSi.SGT
    else
        //drop the signal
```

Alternatively, if the DSI signal is not available, calculate the derived signal using the VSI signals available and store in DSI_new list. For example, harsh braking and rapid acceleration can be calculated using the acceleration vehicle signal.

Figure 5:
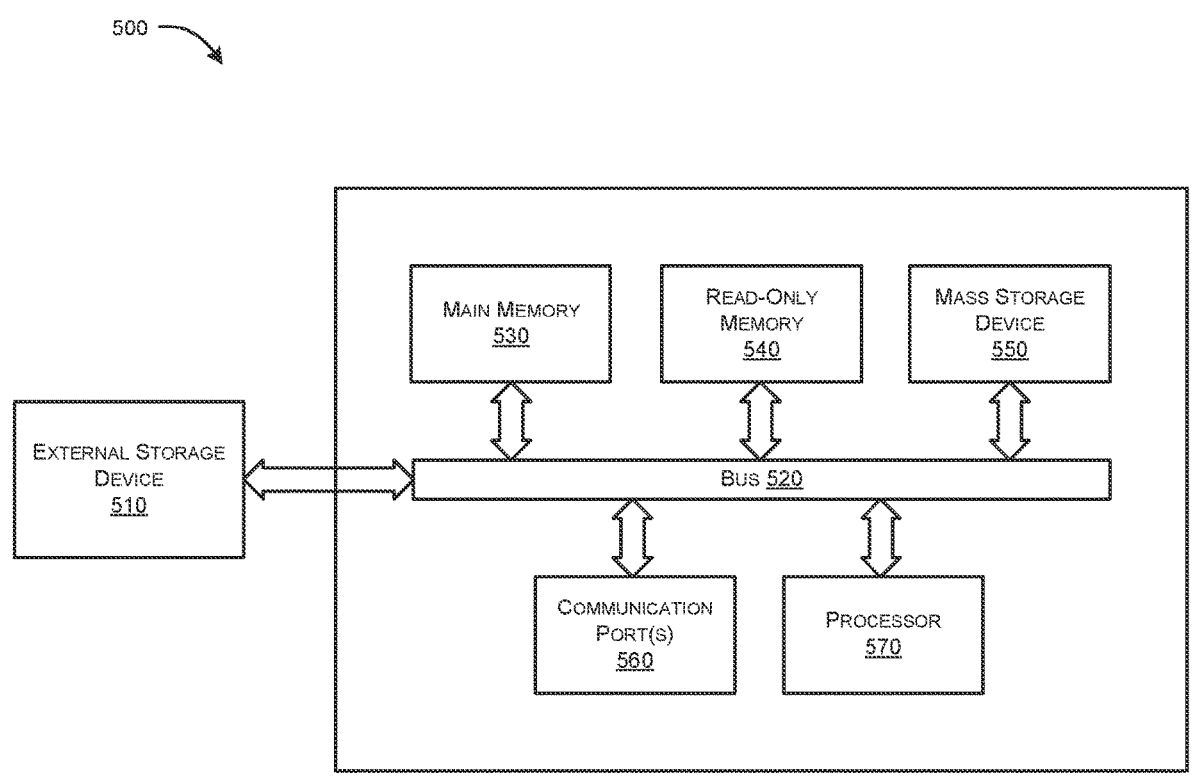
FIG. 5 illustrates an exemplary computer system in which or with which embodiments of the present invention can be utilized in accordance with embodiments of the present disclosure.

FIG. 5 illustrates an exemplary computer system in which or with which embodiments of the present invention can be utilized in accordance with embodiments of the present disclosure. As shown in FIG. 5, computer system 500 can include an external storage device 510, a bus 520, a main memory 530, a read only memory 540, a mass storage device 550, communication port 560, and a processor 570. A person skilled in the art will appreciate that the computer system may include more than one processor and communication ports. Examples of processor 570 include, but are not limited to, an Intel® Itanium® or Itanium 2 processor(s), or AMD® Opteron® or Athlon MP® processor(s), Motorola® lines of processors, FortiSOC™ system on chip processors or other future processors. Processor 550 may include various modules associated with embodiments of the present invention. Communication port 560 can be any of an RS-232 port for use with a modem based dialup connection, a 10/100 Ethernet port, a Gigabit or 10 Gigabit port using copper or fiber, a serial port, a parallel port, or other existing or future ports. Communication port 550 may be chosen depending on a network, such a Local Area Network (LAN), Wide Area Network (WAN), or any network to which computer system connects. Memory 530 can be Random Access Memory (RAM), or any other dynamic storage device commonly known in the art. Read-only memory 540 can be any static storage device(s) e.g., but not limited to, a Programmable Read Only Memory (PROM) chips for storing static information e.g., start-up or BIOS instructions for processor 570. Mass storage 550 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 782 family) or Hitachi (e.g., the Hitachi Deskstar 4K800), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 520 communicatively couples processor(s) 570 with the other memory, storage and communication blocks. Bus 520 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 550 to software system.

Optionally, operator and administrative interfaces, e.g. a display, keyboard, and a cursor control device, may also be coupled to bus 520 to support direct operator interaction with a computer system. Other operator and administrative interfaces can be provided through network connections connected through communication port 550. The external storage device 510 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

Thus, the present disclosure provides a unique and inventive solution for aggregating the data received from plurality of sources (OEM, After market dongle etc.) for a single vehicle trip in one format, using common identifiers enables trip level insights along with vehicle level insights, with data correlation matrix. Segregating derived signals from sensor signals can be used to derive the cost price of the signals from the data providers. The sensor signals are mandatory and hence need to be made available by the data provider. However, the distributor or the consumer shall have the option take derived signals from provider or generate at their end, thus reducing the cost of data received from provider. Data processing and storage optimization by efficient filtering of signals, based on data consumer needs. Distributing a data signals from multiple providers with the same taxonomy is extremely useful for the data consumers that need data from multiple providers. It helps optimize the data ingestion and processing and reduces processing and integration overhead.

While considerable emphasis has been placed herein on the preferred embodiments, it will be appreciated that many embodiments can be made and that many changes can be made in the preferred embodiments without departing from the principles of the invention. These and other changes in the preferred embodiments of the invention will be apparent to those skilled in the art from the disclosure herein, whereby it is to be distinctly understood that the foregoing descriptive matter to be implemented merely as illustrative of the invention and not as limitation.

ADVANTAGES OF THE PRESENT DISCLOSURE

The present disclosure provides for a system that aggregates a set of data packets received from a plurality of sources such as OEM, After market dongle and the like for a single vehicle trip in one format, using common identifiers.

The present disclosure provides provide for a system that enables trip level insights along with vehicle level insights, with data correlation matrix.

The present disclosure provides for a system for segregating derived signals from sensor signals to derive the cost price of the signals from the data providers.

The present disclosure provides for a system that reduces the cost of data received from a provider.

The present disclosure provides a system Data processing and storage optimization by efficient filtering of signals, based on data consumer needs.

The present disclosure provides for a system for distributing a data signals from multiple providers with the same taxonomy is extremely useful for the data consumers that need data from multiple providers. It helps optimize the data ingestion and processing and reduces processing and integration overhead.

What is claimed is:

1. A system for harmonizing automotive data, said system comprising:
   a plurality of sensors associated with an automotive vehicle;
   a processor;
   a harmonizing module coupled to the processor for harmonizing a set of automotive data packets received from one or more first computing devices associated with a plurality of automotive vehicles, the harmonizing module configured to:
   receive a first set of signals from a first sensor of the plurality of sensors, the first set of signals pertaining to a set of sensor signals captured by the first sensor during a trip of the automotive vehicle, wherein the trip indicates a time during which ignition of the automotive vehicle is continuously ON;
   receive a second set of signals from a distributed storage system associated with the automotive vehicle, said second set of signals pertaining to a set of signals derived from the set of sensor signals and stored in the distributed storage system;

generate a third set of signals, wherein the third set of signals is generated by aggregating the first and the second set of signals, wherein the first and the second set of signals are associated with a predefined identifier, wherein the predefined identifier is further associated with the first sensor; and organize, the third set of signals generated in a predefined format based on a predetermined set of parameters, said predetermined set of parameters comprising a signal name, signal type, signal range, description and timeline associated with the first and the second set of signals received, wherein the third set of signals are sent as a trip message to a user computing device, wherein the harmonizing module determines a valid third set of signals from the signal range, wherein the signal range pertain to a range of the third set of signal in a predefined threshold that ensures invalid values are discarded and wherein upon determination of the valid third set of signals, the harmonizing module defines a minimum signal set comprising the valid third set of signals, wherein the minimum signal set is sent with each said trip message in a predetermined data file.

2. The system as claimed in claim 1, wherein the harmonizing module filters one or more unwanted signals from the organized third set of signals, and wherein the harmonizing module further provides a predefined nomenclature for the organized third set of signals.

3. The system as claimed in claim 1, wherein the harmonizing module generates a plurality of third set of signals by aggregating a plurality of first and second set of signals received and derived from the plurality of sensors.

4. The system as claimed in claim 1, wherein the harmonizing module organises the plurality of third set of signals in the predefined format based on the predetermined set of parameters.

5. The system as claimed in claim 1, wherein the signal name associated with the predetermined set of parameters pertain to a predefined name of the signal used to represent automotive signals, wherein the signal type pertain to a data type required to store a signal value associated with the first and second set of signals.

6. The system as claimed in claim 1, wherein the harmonizing module extracts a first set of attributes pertaining to a set of enumeration signals, wherein the harmonizing module extracts a second set of attributes pertaining to a set of non-enumeration signals.

7. The system as claimed in claim 1, wherein the description associated with the predetermined set of parameters pertains to a representation of each integer value for the set of enumeration signals and units for the set of non-enumeration signals.

8. The system as claimed in claim 1, wherein the plurality of third set of signals are correlated based on a timeline associated with each third set of signals.

9. The system as claimed in claim 1, wherein the harmonizing module adds a trip identifier to the third set of signals in each trip of the automotive vehicle.

10. The system as claimed in claim 7, wherein the timeline associated with each third set of signals is based on a third set of attributes, said third set of attributes comprising Vehicle Identification Number (VIN), a Trip Identifier (Tripid), Signal Generation Timestamp (SGT), and Signal collection Timestamp (SCT).

11. The system as claimed in claim 1, wherein the first and the second set of signals for the automotive vehicle is received in a real-time mode, a batch mode or a combination thereof.

12. The system as claimed in claim 1, wherein if the trip message do not contain the predetermined set of parameters, the trip message is rejected.

13. The system as claimed in claim 1, wherein the harmonizing module filters unwanted redundant data based on the predetermined set of parameters.

14. The system as claimed in claim 1, wherein the harmonizing module calculates a second set of signals when the second set of signals are not received from the distributed source system.

15. A method for harmonizing automotive data, said method comprising:

receiving, by a harmonizing module, a first set of signals from a first sensor of a plurality of sensors, the first set of signals pertaining to a set of sensor signals captured by the first sensor during a trip of the automotive vehicle, wherein the trip indicates time during which ignition of the automotive vehicle is continuously ON;

receiving, by the harmonizing module, a second set of signals from a distributed storage system associated with the automotive vehicle, said second set of signals pertaining to a set of signals derived from the set of sensor signals and stored in the distributed storage system;

generating, by the harmonizing module, a third set of signals, wherein the third set of signals is generated by aggregating the first and the second set of signals with a predefined identifier, wherein the predefined identifier is associated with the first sensor; and organizing, by the harmonizing module, the third set of signals generated in a predefined format based on a predetermined set of parameters, said predetermined set of parameters comprising a signal name, signal type, signal range, description and timeline associated with the first and the second set of signals received, wherein the third set of signals are sent as a trip message to a user computing device, wherein the harmonizing module determines a valid third set of signals from the signal range, wherein the signal range pertain to a range of the third set of signal in a predefined threshold that ensures invalid values are discarded and wherein upon determination of the valid third set of signals, the harmonizing module defines a minimum signal set comprising the valid third set of signals, wherein the minimum signal set is sent with each said trip message in a predetermined data file.

16. The method as claimed in claim 14, wherein the method further comprises:

determining, by the harmonizing module, a valid third set of signals from the signal range, wherein the signal range pertain to a range of the third set of signal in a predefined threshold that ensures invalid values are discarded.

17. The method as claimed in claim 15, wherein the method further comprises:

upon determination of the valid third set of signals, defining, by the harmonizing module, a minimum signal set comprising the valid third set of signals, wherein the minimum signal set is sent with each said trip message in a batch data file.

18. A non-transitory computer readable medium comprising machine executable instructions that are executable by a processor to:

receive a first set of signals from a first sensor of a plurality of sensors associated with an automotive vehicle, the first set of signals pertaining to a set of sensor signals captured by the first sensor during a trip of the automotive vehicle, wherein the trip indicates a time during which ignition of the automotive vehicle is continuously ON;

receive a second set of signals from a distributed storage system associated with the automotive vehicle, said second set of signals pertaining to a set of signals derived from the set of sensor signals and stored in the distributed storage system;

generate a third set of signals, wherein the third set of signals is generated by aggregating the first and the second set of signals with a predefined identifier, wherein the predefined identifier is associated with the first sensor; and organise, the third set of signals generated in a predefined format based on a predetermined set of parameters, said predetermined set of parameters comprising a signal name, signal type, signal range, description, and timeline associated with the first and the second set of signals received, wherein the third set of signals are sent as a trip message to a user computing device, wherein the harmonizing module determines a valid third set of signals from the signal range, wherein the signal range pertain to a range of the third set of signal in a predefined threshold that ensures invalid values are discarded and wherein upon determination of the valid third set of signals, the harmonizing module defines a minimum signal set comprising the valid third set of signals, wherein the minimum signal set is sent with each said trip message in a predetermined data file.

* * * * *